Patented May 8, 1928.

1,668,806

UNITED STATES PATENT OFFICE.

CHARLES L. GABRIEL AND CHARLES BOGIN, OF TERRE HAUTE, INDIANA, ASSIGNORS TO COMMERCIAL SOLVENTS CORPORATION, OF TERRE HAUTE, INDIANA, A CORPORATION OF MARYLAND.

NORMAL BUTYL LACTATE.

No Drawing. Application filed November 29, 1926, Serial No. 151,595. Renewed February 24, 1928.

The present invention relates to butyl esters of lactic acid, and more particularly to the normal primary butyl ester of alpha hydroxy propionic acid (fermentation lactic acid) which substance has the general formula, $CH_3 CH(OH) CO_2 C_4H_9$, and the following structural formula:—

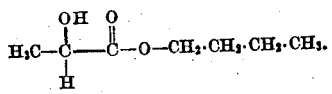

The normal primary butyl alcohol ester of alpha hydroxy propionic acid, which substance will be subsequently mentioned as "butyl lactate", is a water-white, colorless liquid boiling without decomposition at 186-9° C. under atmospheric pressure. It is insoluble in water and neutral to methyl orange.

Butyl lactate may be readily prepared in the following manner. 100 lbs. of 70% lactic acid is mixed with 225 lbs. of normal primary butyl alcohol, and this mixture is then distilled until the temperature of the liquid reaches the boiling point of normal primary butyl alcohol—i. e. 117° C. The purpose of this distillation is to substantially dehydrate the lactic acid. Normal primary butyl alcohol forms a constant-boiling mixture with water, this mixture containing about 30% of water, and distilling at 92° C. By adding a large excess of normal primary butyl alcohol over that amount required for esterification of the alpha hydroxy propionic acid, it is thus possible to remove practically all of the water that was introduced into the mixture in the aqueous lactic acid (70%) solution.

Dry hydrochloric acid gas is then bubbled into the residual mixture for about an hour to serve as a catalyst for the esterification, the mixture being refluxed. The refluxing is continued for about two hours after the addition of hydrochloric acid gas has ceased, and the mixture is allowed to cool.

On cooling an aqueous layer, formed during esterification and containing a major portion of the residual hydrochloric acid passed into the mixture, will be found under the reaction mixture. This is drained off and water is added to the mixture, one quarter volume being used, to wash out traces of hydrochloric acid. The water is then drained off in a like manner.

The washed residue is then distilled, the fraction passing over at 186-9° C. being the butyl lactate thus prepared. A yield of 75% of the theoretical, or better, is thus obtained.

Butyl lactate is soluble in or miscible with a great variety of organic liquids, such as hydrocarbons of the benzol series, aliphatic alcohols, and the aliphatic esters of the fatty acids. It is a solvent for nitrocellulose and for many varnish gums. On account of these properties and in view of its low rate of volatility, butyl lactate forms a valuable constituent of nitrocellulose lacquers.

The use of this new substance in the manner described has been claimed by us in U. S. application Serial No. 31,969, filed May 21st, 1925, and forms no part of the present invention.

Now having having fully described our invention, we claim the following as new and novel:—

1. As a new composition of matter, the normal primary butyl ester of alpha hydroxy propionic acid.

2. A composition of matter comprising a butyl ester of lactic acid whose molecular structure is expressed by the following formula:

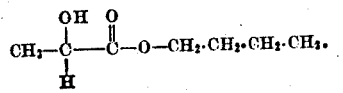

3. As a new composition of matter, the normal primary butyl ester of alpha hydroxy propionic acid, a colorless, water white, liquid boiling at 186-9° C.

In testimony whereof we affix our signatures.

CHARLES L. GABRIEL.
CHARLES BOGIN.